US012345327B1

(12) United States Patent
Weston et al.

(10) Patent No.: US 12,345,327 B1
(45) Date of Patent: Jul. 1, 2025

(54) VEHICLE TRANSMISSION CONTROL SYSTEM

(71) Applicant: FORD GLOBAL TECHNOLOGIES, LLC, Dearborn, MI (US)

(72) Inventors: Keith Weston, Canton, MI (US); Zackary Swisher, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/761,684

(22) Filed: Jul. 2, 2024

(51) Int. Cl.
| | |
|---|---|
| *F16H 61/16* | (2006.01) |
| *F16H 59/02* | (2006.01) |
| *F16H 59/50* | (2006.01) |
| *F16H 59/54* | (2006.01) |
| *F16H 61/02* | (2006.01) |

(52) U.S. Cl.
CPC ..... *F16H 61/0248* (2013.01); *F16H 59/0204* (2013.01); *F16H 59/54* (2013.01); *F16H 61/16* (2013.01); *F16H 2059/0247* (2013.01); *F16H 2059/506* (2013.01); *F16H 2061/163* (2013.01)

(58) Field of Classification Search
CPC .............. F16H 61/16; F16H 61/0248; F16H 2061/163; F16H 59/54; F16H 59/0204; F16H 2059/0247; F16H 2059/506; B60W 2050/007–2050/0074
See application file for complete search history.

(56) References Cited

U.S. PATENT DOCUMENTS

| | | | |
|---|---|---|---|
| 2007/0099752 A1* | 5/2007 | Saito | F16H 61/0213 477/34 |
| 2018/0163852 A1 | 1/2018 | Gadola | |
| 2018/0135744 A1* | 5/2018 | Kuang | B60W 50/0097 |
| 2021/0404552 A1 | 12/2021 | Oyama et al. | |
| 2022/0242448 A1 | 8/2022 | Chen et al. | |
| 2023/0026614 A1* | 1/2023 | Miura | F16H 59/18 |
| 2024/0001904 A1 | 1/2024 | Terai | |
| 2024/0102551 A1* | 3/2024 | Inoue | F16H 59/18 |

* cited by examiner

*Primary Examiner* — Tinh Dang
(74) *Attorney, Agent, or Firm* — Vincent Mastrogiacomo; Brooks Kushman P.C.

(57) ABSTRACT

A vehicle includes a transmission and a controller. The transmission is configured to transition between automatic and manual modes. The controller is programmed to, in response to the transmission operating in the manual mode and an absence of receiving a manual command to shift the transmission for a predetermined period of time, transition the operation of the transmission from the manual mode to the automatic mode. The controller is further programmed to, in response to the transmission operating in the manual mode, an absence of receiving the manual command to shift the transmission for the predetermined period of time, and a condition flagged to suppress an upshift in the transmission, remain in the manual mode.

20 Claims, 2 Drawing Sheets

VEHICLE TRANSMISSION CONTROL SYSTEM

TECHNICAL FIELD

The present disclosure relates to control systems for vehicle transmissions.

BACKGROUND

Vehicles may include control systems that are operable to shift the transmission between a plurality of gears.

SUMMARY

A vehicle includes a transmission, a shifter, and a controller. The transmission is configured to shift between a plurality of gears and transition between automatic and manual modes. The shifter is configured to shift the transmission between the plurality of gears. The controller is programmed to, in response to the transmission operating in the automatic mode, automatically shift the transmission between the plurality of gears based on a shift schedule. The controller is further programmed to, in response to the transmission operating in the manual mode, shift the transmission between the plurality of gears based on receiving inputs from the shifter. The controller is further programmed to, in response to the transmission operating in the manual mode and an absence of receiving inputs from the shifter for a predetermined period of time, transition the operation of the transmission from the manual mode to the automatic mode. The controller is further programmed to, in response to the transmission operating in the manual mode, an absence of receiving inputs from the shifter for a predetermined period of time, an operating condition corresponding to a condition for upshifting the transmission according to the shift schedule, and a secondary condition flagged to suppress an upshift in the transmission while in the manual mode, override transitioning to the automatic mode and remain in the manual mode such that transmission does not upshift.

A vehicle controller includes input channels, output channels, and control logic. The input channels are configured to receive user input signals indicative of commands to shift a transmission of a vehicle in a manual mode. The output channels are configured deliver an output signal to transition operation of the transmission from the manual mode to an automatic mode. The control logic is programmed to, in response to the transmission operating in the manual mode and an absence of receiving the user input signals to shift the transmission in the manual mode for a predetermined period of time, generate the output signal to transition the operation of the transmission to the automatic mode. The control logic is further programmed to, in response to the transmission operating in the manual mode, an absence of receiving the user input signals to shift the transmission in the manual mode for a predetermined period of time, and a condition flagged to suppress an upshift in the transmission, override generating the output signal to remain in the manual mode.

A vehicle includes a transmission and a controller. The transmission is configured to transition between automatic and manual modes. The controller is programmed to, in response to the transmission operating in the manual mode and an absence of receiving a manual command to shift the transmission for a predetermined period of time, transition the operation of the transmission from the manual mode to the automatic mode. The controller is further programmed to, in response to the transmission operating in the manual mode, an absence of receiving the manual command to shift the transmission for the predetermined period of time, and a condition flagged to suppress an upshift in the transmission, remain in the manual mode.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
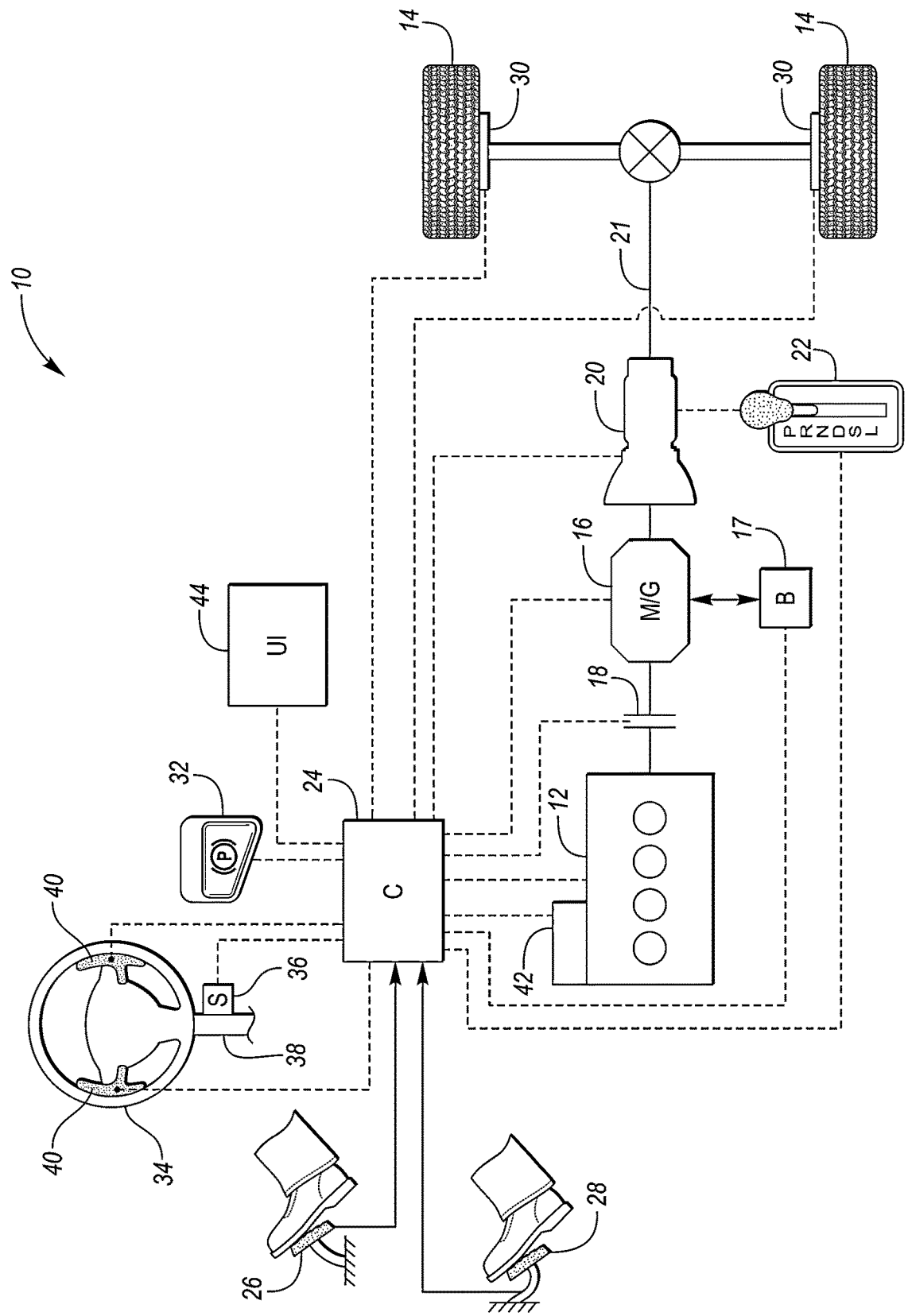
FIG. 1 is a schematic diagram representative of a vehicle and a vehicle powertrain.

Referring to FIG. 1, a diagram representative of a vehicle 10 and a vehicle powertrain is illustrated. The vehicle 10 includes an engine 12 that is configured to transmit power through the powertrain and to at least one drive wheel 14. The vehicle 10 may be a hybrid vehicle that includes a motor/generator (M/G) 16 that is also configured to transmit power through the powertrain and to at least one drive wheel 14. The M/G 16 may be configured to operate as both a motor and a generator. When operating as a motor, the M/G 16 may receive electrical power from a traction battery 17. When operating as a generator the M/G 16 may deliver electrical power to the traction battery 17 in order to recharge the traction battery 17. The engine 12 may be configured to selectively couple to and decouple from the powertrain through an engine disconnect clutch 18.

The powertrain may also include a transmission (or gearbox) 20. The gearbox may comprise all or a portion of the transmission 20. The transmission 20 may be an automatic transmission that includes gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft and a transmission input shaft. The transmission 20 may be automatically shifted in automatic mode from one ratio to another based on various vehicle and ambient operating conditions by an associated controller (e.g., controller 24 described in further detail below). Power and torque from both engine 12 and/or the M/G 16 may be delivered to and received by transmission 20. The transmission 20 then provides powertrain output power and torque to the drive wheels 14 via an output shaft 21.

The transmission 20 may further include a torque converter that is operable to connect the engine 12 and/or the M/G 16 to the gearbox portion of the transmission 20. The transmission 20 may further include a torque converter bypass clutch that is operable to connect the engine 12 and/or the M/G 16 to the gearbox portion of the transmission 20 via bypassing the torque converter.

The transmission 20 may also include a gear selector 22 allows an operator to shift the transmission 20 between park (P), reverse (R), neutral (N), drive (D), sport(S), and low gear (L) positions. The gear selector 22 may include a mechanical connection that selects the desired gear position or may be a shift-by-wire gear selector that sends a signal to the transmission 20 (or a controller thereof) to shift the transmission 20 between the park (P), reverse (R), neutral (N), drive (D), sport(S), and low gear (L) positions. The signal sent from the gear selector 22 may be an electrical signal that is transmitted to the transmission 20 via an electrical wire or may be a wireless signal that is transmitted to the transmission 20 via a wireless transmitter. Wireless communications may be made via any known wireless technology known in the art. The gear selector 22 may be a lever, dial, one or more push buttons, touch screen, or any other user interface known in the art that may be utilized as a gear selector. The gear selector 22 may be a combination of any of the user interfaces know in the art.

The powertrain further includes an associated controller 24 such as a powertrain control unit (PCU). While illustrated as one controller, the controller 24 may be part of a larger control system and may be controlled by various other controllers throughout the vehicle 10, such as a vehicle system controller (VSC). It should therefore be understood that the controller 24 and one or more other controllers can collectively be referred to as a "controller" that controls various actuators in response to signals from various sensors to control functions such as starting/stopping the engine 12, operating the M/G 16 to provide wheel torque or charge a battery, select or schedule shifts of the transmission 20, transition the transmission 20 to the desired gear based on an input from the gear selector 22, open/close the engine disconnect clutch 18, etc. The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 12 or vehicle 10.

Control logic or functions performed by the controller 24 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle, engine, and/or powertrain controller, such as controller 24. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 26 may be used by the operator of the vehicle 10 to provide a demanded torque, power, or drive command to propel the vehicle 10. In general, depressing and releasing the accelerator pedal 26 generates an accelerator pedal position signal that may be interpreted by the controller 24 as a demand for increased power or decreased power, respectively. A brake pedal 28 may also be used by the operator of the vehicle 10 to provide a demanded braking torque to slow the vehicle. In general, depressing the brake pedal 28 generates a brake pedal position signal that may be interpreted by the controller 24 as a demand to decrease the vehicle speed. Based upon inputs from the accelerator pedal 26 and brake pedal 28, the controller 24 commands the torque to the engine 12, M/G 16, and/or friction brakes 30. The friction brakes 30 may include an electronic parking brake. The electronic parking brake may be activated by the controller 24 depending on specific conditions of the vehicle 10. The electronic parking brake may also be activated when the vehicle operator selects to activate the electronic parking brake through a user interface 32. The user interface 32 may be a push button that activates an electronic switch to engage the electronic parking brake.

The vehicle 10 may include a steering wheel 34 that is configured to steer a pair of front wheels (not shown). A sensor 36 may be disposed about a steering column 38. The sensor 36 may be configured to detect an angular displacement of the steering wheel 34 and/or an angular velocity (i.e., rotational speed) of the steering wheel 34. The sensor 36 may be configured to communicate with the controller 24 such that the controller 24 receives signals from the sensor 36 that are indicative of the angular displacement and/or the angular velocity of the steering wheel 34.

The vehicle 10 may include one or more gear shifters 40 that allow an operator of the vehicle 10 to manually shift between the plurality of ratios or gears (i.e., $1^{st}$, $2^{nd}$, $3^{rd}$, etc. gears) of the transmission 20 while the transmission is in a manual mode. The one or more gear shifters 40 may be disposed on the steering wheel 34. More specifically, the one or more gear shifters 40 may include a pair of paddle shifters where activation or engagement of one of the paddle shifters is configured to trigger a downshift of the transmission 20 while activation or engagement of the other of the paddle shifters is configured to trigger an upshift of the transmission 20. The one or more gear shifters 40 may be configured to communicate with the controller 24 such that the controller 24 receives signals indicative of an upshift or a downshift, which is then communicated to the transmission 20 to cause the upshift or downshift.

The transmission 20 is configured to and transition between the automatic mode (e.g., the mode where the transmission 20 may be automatically shifted from one ratio or gear to another based on various vehicle and ambient operating conditions) and the manual mode (e.g., the mode where the transmission 20 is shifted from one ratio or gear to another based on receiving inputs from the user via one of the shifters 40 or another interface that is configured to receive a manual input to shift the transmission 20). The transmission 20 may be configured to transition between the automatic and manual modes in response to engagement of the shifters 40 (e.g., engagement of the shifters 40 may operate to transition the transmission 20 from the automatic mode to the manual mode), nonengagement of the shifters 40 (e.g., nonengagement of the shifters 40 for a predetermined period of time may operate to transition the transmission 20 from the manual mode to the automatic mode), or via selection on a user interface 44 (e.g., the transmission 20 may be transitioned to either the manual mode or automatic mode based on a user input to the user interface 44). The user interface 44 may be a lever, dial, one or more push buttons, touch screen, or any other user interface known in the art that may be utilized to select operation of the transmission 20 in either the automatic mode or manual mode. More specifically, the controller 24 may be configured to transition the transmission 20 between the manual mode and the automatic mode upon receiving signals in response to engagements, nonengagements, inputs, etc. from either the shifters 40 or the user interface 44.

The engine 12 may be configured to auto-start or auto-stop based on various conditions of vehicle 10. The controller 24 may command a starter motor (which alternatively may be an integrated starter/generator) 42 to turn the crankshaft of the engine 12 in order to start the engine 12. Alternatively, the controller 24 may command the M/G 16 to turn the crankshaft of the engine 12 by closing the engine disconnect clutch 18.

The controller 24 may be configured to receive various states or conditions of the various vehicle components illustrated in FIG. 1 via electrical signals. The electrical signals may be delivered to the controller 24 from the various components via input channels. Additionally, the electrical signals received from the various components may be indicative of a request or a command to change or alter a state of one or more of the respective components of the vehicle 10. The controller 24 includes output channels that are configured to deliver requests or commands (via electrical signals) to the various vehicle components. The controller 24 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described herein is merely exemplary and is not intended to be limiting. Other non-hybrid or hybrid vehicle configurations should be construed as disclosed herein. Other vehicle configurations may include, but are not limited to, vehicles powered only by an internal combustion engine, micro-hybrid vehicles (i.e., vehicles that are powered by an internal combustion engine that includes a start/stop system), series hybrid vehicles, parallel hybrid vehicles, series-parallel hybrid vehicles, or any other vehicle configuration known to a person of ordinary skill in the art.

Figure 2:
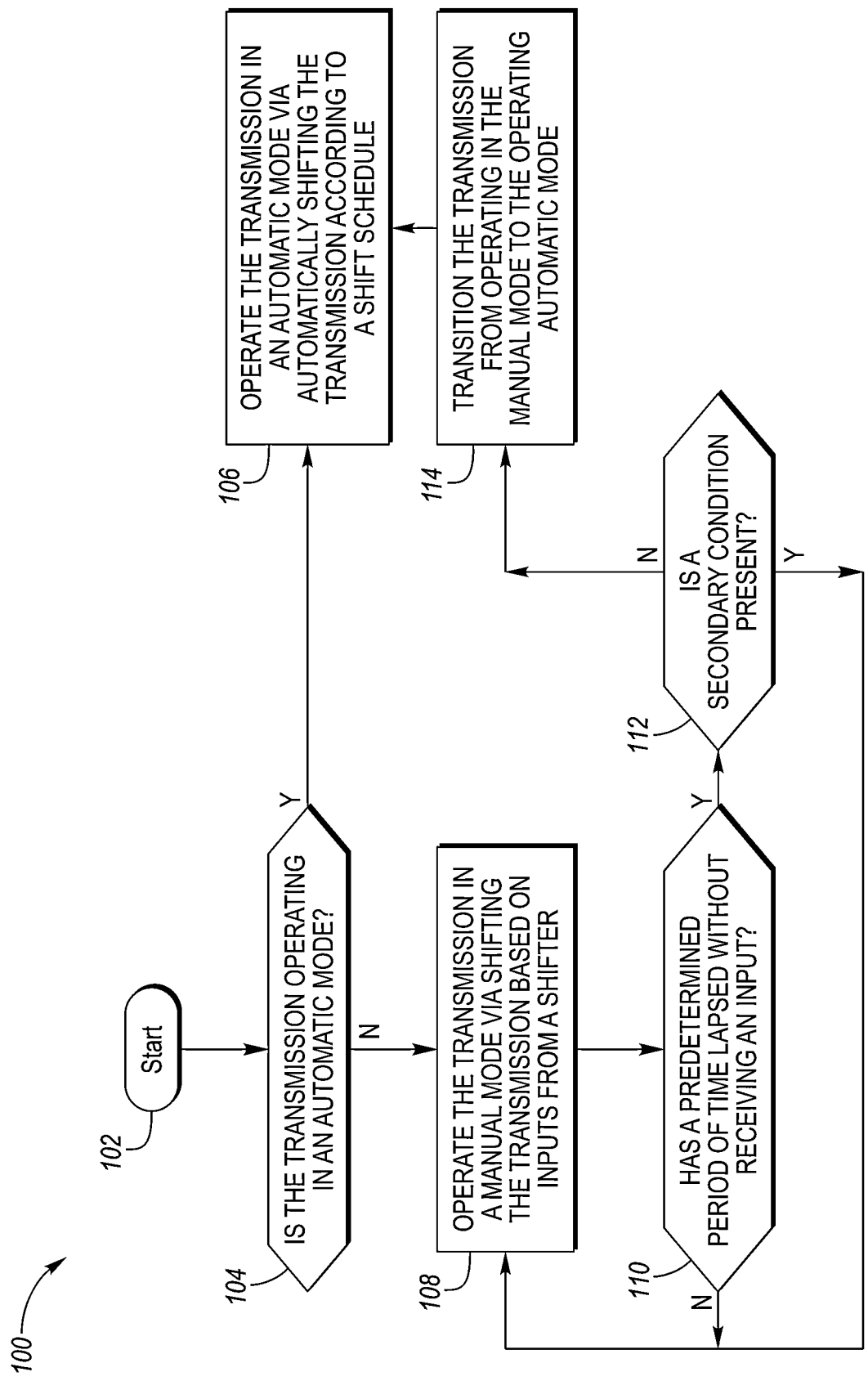
FIG. 2 is a flowchart illustrating a method of for transitioning the transmission between automatic and manual modes.

Referring to FIG. 2, a method 100 of for transitioning the transmission 20 between automatic and manual modes is illustrated. The method 100 may be stored as control logic and/or an algorithm within the controller 24. The controller 24 may implement the method 100 by controlling the various components of the vehicle 10. The method 100 is initiated at start block 102. Once the method 100 is initiated, the method 100 moves on to block 104 where it is determined if the transmission 20 is operating in the automatic mode. If the transmission 20 is operating the in the automatic mode, the method 100 moves on to block 106 where the transmission 20 is operated in the automatic mode via automatically shifting the transmission 20 between the plurality of ratios or gears (i.e., $1^{st}$, $2^{nd}$, $3^{rd}$, etc. gears) according to the shift schedule. More specifically, at block 106, the controller 24 may generate output signals that are sent to the transmission 20 to control shifting the transmission 20 between the plurality of ratios or gears (i.e., $1^{st}$, $2^{nd}$, $3^{rd}$, etc. gears) according to the shift schedule.

Returning to block 104, if the transmission 20 is not operating in the automatic mode and it is determined that the transmission 20 is operating in the manual mode, the method 100 moves on to block 108 where the transmission 20 is operated in the manual mode via shifting the transmission 20 between the plurality of ratios or gears (i.e., $1^{st}$, $2^{nd}$, $3^{rd}$, etc. gears) based on receiving inputs from one of the shifters 40. More specifically, at block 108, the controller 24 may generate output signals that are sent to the transmission 20 to control shifting the transmission 20 between the plurality of ratios or gears (i.e., $1^{st}$, $2^{nd}$, $3^{rd}$, etc. gears) in response to the controller receiving inputs from one of the shifters 40 to shift the transmission 20.

Next, the method 100 moves on to block 110, wherein it is determined if a predetermined period of time has lapsed since the controller 24 has received an input from at least one of the shifters 40 to shift the transmission 20 between the plurality of ratios or gears (i.e., $1^{st}$, $2^{nd}$, $3^{rd}$, etc. gears). If the predetermined period of time has not lapsed since the controller 24 received an input from at least one of the shifters 40 to shift the transmission 20 between the plurality of ratios or gears, the method 100 returns to block 108. If the predetermined period of time has lapsed since the controller 24 received an input from at least one of the shifters 40 to shift the transmission 20 between the plurality of ratios or gears, the method 100 moves on to block 112.

At block 112, it is determined if a secondary condition is present. Such a secondary condition may correspond to a condition that is flagged to suppress an upshift in the transmission. More specifically, such a secondary condition may correspond to a condition that is flagged to suppress an upshift in the transmission while in the manual mode, where such an upshift may be an automatic upshift that would or could occur if the transmission 20 were to immediately transition from the manual mode to the automatic mode. If a secondary condition is not present at block 112, the method 100 moves on to block 114, where the transmission 20 is transitioned from operating in the manual mode to operating in the automatic mode. The method 100 then returns to block

106. More specially at block 114, the controller 24 may generate an output signal to transition the operation of the transmission 20 from the manual mode to the automatic mode.

Returning to block 112, if a secondary condition is present at block 112, the method 100 returns on to block 108. The step of transitioning from block 112 to block 108 may correspond to overriding a command (e.g., a signal from the controller 24) to transition from the manual mode to the automatic mode, and ultimately commanding the transmission 20 to remain in the manual mode. Such a command for the transmission 20 to remain in the manual mode may be configured to prevent the transmission 20 from upshifting automatically in a scenario where such an upshift may be unwanted. The secondary conditions may correspond to such conditions where it is not desirable for a sudden upshift to occur while operating in the manual mode. Therefore, the secondary conditions are flagged prevent a transition from the manual mode to the automatic mode in order to suppress an automatic upshift in the transmission 20. For example, if a transition to the automatic mode from the manual would result in an immediate upshift or likely result in a sudden upshift in the transmission 20, which could be unexpected to or unwanted by an operator who is operating the transmission 20 in the manual mode, it may be desirable to remain in the manual mode so that the upshift does not occur, particularly if one of the secondary conditions are present. For example, if transmission 20 is operating in the manual mode and the current operating condition of the transmission 20 corresponds to a condition that would result in upshifting the transmission 20 according to the shift schedule if the transmission 20 were operating the automatic mode, it may be desirable to override a transition of the transmission 20 from the manual mode to the automatic mode if one or more of the secondary conditions are present in order to prevent the upshift.

The secondary conditions may correspond to the vehicle 10 traveling along a downward slope; the vehicle 10 traveling along a downward slope that is greater than a threshold; the vehicle 10 traveling within a predetermined geofenced region (e.g., at locations where high acceleration is expected such as on-ramps to the highways, off road use, or race track type use); an operator visual field-of-view deviating from a predetermined position (e.g., a driver or operator is not focused on the road, a driver is looking away from the road ahead, a driver engaging a control panel, etc.); a distance between the vehicle 10 and another vehicle (e.g., another vehicle immediately ahead of the vehicle 10) being less than a threshold; a slipping condition of the vehicle (e.g., the vehicle is experience slip that is greater than a threshold); a lateral force (e.g., a force transverse to the direction of travel of the vehicle 10) acting on the vehicle 10 exceeding a threshold; engagement of the friction brakes 30; during regenerative braking via the M/G 16; image recognition, street sign recognition, or traffic map recognition scenarios (e.g., the vehicle is coming to an intersection, a stop sign, a traffic light, a corner, a highway on ramp, a highway off ramp, a hill, a grade, or other scenarios where the driver will potentially be slowing the vehicle 10 or bringing the vehicle 10 to a stop); engagement of stability control or anti-lock braking; a user configured condition; selection of a driving mode where manual operation is desired or necessary (e.g., selection of a drive mode such as slippery mode, tow haul mode, sport mode, normal mode, off-road mode, Baja mode, rock crawl mode, etc.); etc.

It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a transmission configured to shift between a plurality of gears and transition between automatic and manual modes;
a shifter configured to shift the transmission between the plurality of gears; and
a controller programmed to,
in response to the transmission operating in the automatic mode, automatically shift the transmission between the plurality of gears based on a shift schedule,
in response to the transmission operating in the manual mode, shift the transmission between the plurality of gears based on receiving inputs from the shifter,
in response to the transmission operating in the manual mode and an absence of receiving inputs from the shifter for a predetermined period of time, transition the operation of the transmission from the manual mode to the automatic mode, and
in response to the transmission operating in the manual mode, an absence of receiving inputs from the shifter for a predetermined period of time, an operating condition corresponding to a condition for upshifting the transmission according to the shift schedule, and a secondary condition flagged to suppress an upshift in the transmission while in the manual mode, override transitioning to the automatic mode and remain in the manual mode such that transmission does not upshift.

2. The vehicle of claim 1, wherein the secondary condition corresponds to the vehicle traveling along a downward slope.

3. The vehicle of claim 1, wherein the secondary condition corresponds to the vehicle traveling within a predetermined geofenced region.

4. The vehicle of claim 1, wherein the secondary condition corresponds to an operator visual field-of-view deviating from a predetermined position.

5. The vehicle of claim 1, wherein the secondary condition corresponds to a distance between the vehicle and another vehicle being less than a threshold.

6. The vehicle of claim 1, wherein the secondary condition corresponds to a slipping condition of the vehicle.

7. The vehicle of claim 1, wherein the secondary condition corresponds to a lateral force acting on the vehicle exceeding a threshold.

8. The vehicle of claim 1 further comprising brakes, and wherein secondary condition corresponds to engagement of the brakes.

9. A vehicle controller comprising:
input channels configured to receive user input signals indicative of commands to shift a transmission of a vehicle in a manual mode;
output channels configured deliver an output signal to transition operation of the transmission from the manual mode to an automatic mode; and
control logic programmed to,
in response to the transmission operating in the manual mode and an absence of receiving the user input signals to shift the transmission in the manual mode for a predetermined period of time, generate the output signal to transition the operation of the transmission to the automatic mode, and
in response to the transmission operating in the manual mode, an absence of receiving the user input signals to shift the transmission in the manual mode for a predetermined period of time, and a condition flagged to suppress an upshift in the transmission, override generating the output signal to remain in the manual mode.

10. The vehicle controller of claim 9, wherein the condition corresponds to the vehicle traveling along a downward slope.

11. The vehicle controller of claim 9, wherein the condition corresponds to the vehicle traveling within a predetermined geofenced region.

12. The vehicle controller of claim 9, wherein the condition corresponds to a distance between the vehicle and another vehicle being less than a threshold.

13. The vehicle controller of claim 9, wherein the condition corresponds to a slipping condition of the vehicle.

14. The vehicle controller of claim 9, wherein the condition corresponds to a lateral force acting on the vehicle exceeding a threshold.

15. The vehicle controller of claim 9 further comprising brakes, and wherein condition corresponds to engagement of the brakes.

16. A vehicle comprising:
a transmission configured to transition between automatic and manual modes; and
a controller programmed to,
in response to the transmission operating in the manual mode and an absence of receiving a manual command to shift the transmission for a predetermined period of time, transition the operation of the transmission from the manual mode to the automatic mode, and
in response to the transmission operating in the manual mode, an absence of receiving the manual command to shift the transmission for the predetermined period of time, and a condition flagged to suppress an upshift in the transmission, remain in the manual mode.

17. The vehicle of claim 16, wherein the condition corresponds to a distance between the vehicle and another vehicle being less than a threshold.

18. The vehicle of claim 16, wherein the condition corresponds to a slipping condition of the vehicle.

19. The vehicle of claim 16, wherein the condition corresponds to a lateral force acting on the vehicle exceeding a threshold.

20. The vehicle of claim 16 further comprising brakes, and wherein condition corresponds to engagement of the brakes.

* * * * *